United States Patent
Storey

[19]
[11] Patent Number: 5,983,554
[45] Date of Patent: Nov. 16, 1999

[54] WEEDLESS JIG

[76] Inventor: Ralph Storey, 900 Long Blvd., #379, Lansing, Mich. 48911

[21] Appl. No.: 08/993,812

[22] Filed: Dec. 18, 1997

[51] Int. Cl.[6] .................................................. A01K 85/02
[52] U.S. Cl. ........................... 43/42.42; 43/43.2; 43/43.4
[58] Field of Search ................... 43/42.4, 42.42, 43/42.43, 43.2, 43.4, 43.6

[56] References Cited

U.S. PATENT DOCUMENTS

| | | |
|---|---|---|
| 454,982 | 6/1891 | Mack . |
| 663,066 | 1/1900 | Strong . |
| 712,032 | 10/1902 | Baker . |
| 719,704 | 2/1903 | Trakel . |
| 823,460 | 6/1906 | Bingheimer . |
| 831,552 | 9/1906 | Hallstrom . |
| 882,882 | 3/1908 | Henzel . |
| 918,206 | 4/1909 | Sheward . |
| 2,119,504 | 11/1938 | Lawrence . |
| 2,241,301 | 5/1941 | Gall .............................................. 43/27 |
| 2,315,440 | 3/1943 | McArthur .................................... 43/39 |
| 2,789,387 | 4/1957 | Plummer, Jr. ............................. 43/43.6 |
| 3,221,437 | 12/1965 | DeLong .................................... 43/43.4 |
| 3,395,480 | 8/1968 | McPherson ............................ 43/42.09 |
| 3,465,466 | 9/1969 | Showalter ................................ 43/44.8 |
| 5,269,089 | 12/1993 | Gariglio ................................. 43/42.43 |
| 5,274,946 | 1/1994 | Fusco ....................................... 43/43.2 |

OTHER PUBLICATIONS

Bass Guide "The Jig", 1997, Zaleski, R, pp. 106–110, esp 109.

*Primary Examiner*—Jack W. Lavinder

[57] ABSTRACT

A weedless jig having an improved stainless steel wire weedguard (31) which provides snag protection to a hook point (22) from the top, front, both sides, and the back. Said weedguard terminates near said hook point in a weed-shedding geometrically shaped snag deflector (28). A novel method creates an encasement (30) which provides the wire weedguard with a smooth surface.

6 Claims, 3 Drawing Sheets

WEEDLESS JIG

BACKGROUND

1. Field of Invention

This invention relates to a fishing lure, more particularly, to a jig type lure with an improved weedguard.

2. Discussion of Prior Art

Fishing jigs are generally characterized by a fishhook having the end opposite the point of the hook near the eye molded into a heavy metallic material, usually lead, which is called the head or jig head. Usually a multifilamented flexible skirt or bucktail is attached to the jig, sometimes in combination with a plastic or pork rind trailer. The point of the hook is often protected from snagging on aquatic vegetation or a submerged object, such as a tree limb by a guard of some type. This guard is called the weedguard.

An effective weedguard is one that provides snag protection to the hook without interfering with the setting of the hook in a fish's mouth.

Most commercially available jigs have a weedguard consisting of a bundle of 20 or 30 nylon bristles protruding from the top of the jig head at a backward angle, and tenninating at a point slightly past the point of the hook. The bristle bundle is often trimmed and bent by the user into a desired form, usually a V shape, with the point of the hook between the V ends.

Despite its popularity the nylon bristle weedguard suffers from certain limitations. The bristle bundle is highly resistant to flexing near its origin from the jig head, and only begins to flex significantly at a point about ¼ inch from the jig head. This lack of uniform flex can effectively reduce the bite of the hook (the distance from the hook point to the shank) by up to 50%. As a result, the percentage of fish landed to those that actually bite is reduced.

Also, when the nylon bristle bundle has been bent into a V shape by the user, minimal snag protection from the backside is an undesired by-product. This occurs when the jig is cast over a submerged limb and is moved up and down by the fisherman in an attempt to attract a fish. As the jig is allowed to fall backwards, the V shaped guard can actually direct a twig or limb underneath it into the bend of the hook, resulting in a snag. This flaw is inherent in any V shaped weedguard, regardless of composition.

Additionally, any weedguard which reaches to or past the hook point can, upon occasion, interfere with attempts by the fisherman to set the hook in the mouth of the fish, a significant disadvantage.

And finally, nylon bristle weedguards aren't nearly as weedless as their names suggests. The guard itself can collect weeds, particularly the fibrous variety.

Another material used as a weedguard is stainless steel wire, and is available commercially in several configurations.

A single strand configuration consists of a strand of wire molded into the jig head at one end, and projects rearwardly toward the hook point at the other, terminating beyond the hook. Although reasonably weedless, the single strand weedguard is prone to snags on submerged limbs because even minimal flexing to one side or the other exposes the hook point and a snag can result.

A double strand configuration consists of two wire strands molded in the jig head with both projecting rearwardly toward and past the hook point. The two wire strands are arranged into a V shape, and again reasonably weedless, but because of the inherent weakness of the V configuration, it is susceptible to snags from the back.

A third type of wire weedguard is a narrow wire loop, molded or fastened to the jig head at one end, and projecting rearwardly to the hook point. The hook point rests in the terminal end of the loop under some tension.

This guard has enjoyed good commercial success on some small jigs (less than ¼ oz.) and on the rigged plastic worm configuration. Its primary weakness is, when sprung (when the hook point no longer rest in the wire loop) it tends to act as a single wire strand weedguard with minimal lateral protection. Again as with any weedguard which reaches to or past the point of the hook it can at times, interfere with the fisherman's attempt to set the hook in the mouth of the fish. Also, fine weed fibers can collect in the wire loop, and are difficult to remove.

Another type of weedguard is one molded as a single unit from plastic in a V configuration. It offers good protection to the hook point from the front and sides, but is highly resistant to flexing laterally, a significant disadvantage. It also suffers from lack of flex at its point of insertion in the jig head, a deficiency shared with the bristle bundle weedguard described above.

Expanding the search from weedguards for jigs to weedguards for any hook, I have found two that bear examination.

The first, U.S. Pat. No. 454,982, A. G. Mack, 1891, uses a single strand wire weedguard terminating in a triangular shape near the points of the two hooks. This weedguard was designed for spoon type lure with multiple hooks. Unfortunately, Mack fails to explain how the terminal end of the weedguard is formed, particularly how the wire end is secured back to the main shaft of the weedguard. This is a critical omission, since the need for a smooth surface on the weedguard, and how this is accomplished should be expressly emphasized.

Also, U.S. Pat. No. 2,119,504, Lawrence, 1938, should be considered. Lawrence describes a live bait rig consisting of a sinker and hook with a weedguard. The weedguard is made from wire with the terminal end of the guard formed in a triangular shape near the hook point, similar to Mack above. The primary deficiencies of Lawrence's weedguard are again in the terminal end of the guard and its attachment back to the main shaft. Lawrence accomplishes this by simply twisting the wire end around the main shaft of the guard. This creates a rough area with an exposed wire end which can snag weeds in an undesirable manner.

OBJECTS AND ADVANTAGES

Accordingly, the objects and advantages of my weedless jig are:

1. to provide a wire weedguard for a jig type fishing lure with a smooth surface, eliminating the weed catching characteristics of earlier weedguards of this type,
2. to provide weed and snag protection for a hook in a jig type lure from the top, front, both sides and the rear, which is not available on any other jig,
3. to provide a weedguard on a jig type lure with consistent flex characteristics throughout its entire length, so when depressed, it allows the full bite of the hook to be exposed,
4. to provide a weedguard for jig type lures with consistent flex characteristics in any direction, serving to increase the percentage of fishhooked to fish which have bitten,
5. to provide a weedguard on a jig type lure which cannot touch the hook point regardless of the direction or manner in which the guard is flexed, 6. to provide weed and snag protection for a hook in a jig type lure from the front, both sides, the back and from underneath, which is not available on any other jig.

The combined effectiveness of these objects and advantages will become increasingly apparent from consideration of the ensuing drawings and descriptions.

Figure 1:
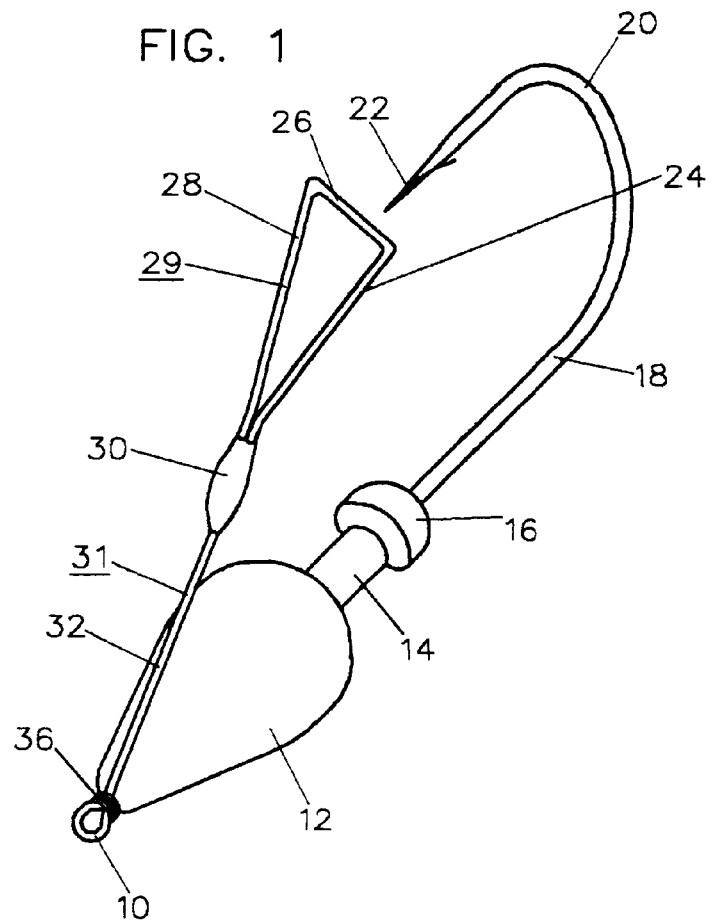
FIG. 1 illustrates an isometric view of the preferred embodiment of a jig. Skirts, bucktails and trailers have been omitted for clarity of illustration.

LIST OF REFERENCE NUMERALS IN DRAWINGS 10 line tie loop
12 jig head
14 jig head neck
16 retaining knob
18 hook shank
20 hook bend
22 hook point and barb
23 lower deflector right side
24 deflector right side
25 lower deflector base
26 deflector base
27 lower deflector left side
28 deflector left side
29 snag deflector
30 encasement of wire end
31 weedguard
32 primary shaft of weedguard
34 wire bend around hook shank
35 wire strand extending forwardly from hook attachment
36 fine wire wrap securing line tie loop
37 wire segment between angle R9 and wire bend 41
38 terminal wire segment
40 wire end
41 360° bend
42 hook shank end, bent upward
44 L-shaped bend in the primary shaft of the weedguard
46 hook eye
R7 angle formed by the main shaft 32 of weedguard and side 24
R9 angle formed at junction of side 23 and wire segment 37
R13 angle formed at junction of side 28 and wire segment 38

SUMMARY

In accordance with the present invention a weedless jig comprises a jig head having a hook extending rearwardly terminating in a bend and a point and barb. The hook point is protected from snagging from the front, both sides and the back by a smooth surfaced weedguard of a predetermined geometric shape which terminates close to, but does not touch the hook point.

DESCRIPTION OF THE INVENTION

Description of the Preferred Embodiment

Referring now to FIG. 1, of the drawings, a jig is shown having a cone shaped jig head 12, neck 14, and retaining knob 16. Extending rearwardly out of the jig head is a hook shank 18 which terminates in a bend 20 and a point and barb 22. A wire line tie loop 10 projects out of the front of the jig head, and main shaft 32 of weedguard 31 angles rearwardly from its proximal origin at the line tie loop. Distally, the main shaft of the weedguard terminates in a triangularly shaped snag deflector 29 which occupies a plane 90° from that of the hook bend. Base segment 26 of deflector 29 is near, but cannot touch the point of the hook regardless of the direction or manner in which the weedguard is flexed. An encasement 30 completes the weedguard.

Figure 2:
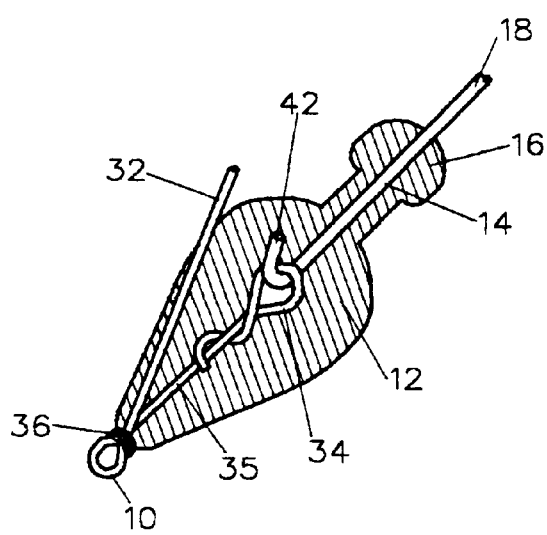
FIG. 2 is a sectional view of a jig head from the longitudinal perspective.

Referring now to FIG. 2, the construction of the jig head, the line tie loop and the main shaft of the weedguard is shown. A strand of stainless steel wire is cut into a length of about 5½ inches. The wire used should provide sufficient resistance to flex in the finished weedguard such that when the full weight of the jig is applied to the front, top, either side, or the back of the weedguard, the point of the hook is not exposed. In the preferred embodiment, stainless steel wire with a diameter of 0.024 inches is satisfactory for jigs from ¼ to 1 ounce in weight. Jigs larger or smaller benefit from a corresponding change in the diameter of the wire used.

Returning now to the construction process, one end of wire strand 35 is wrapped around a bend 42 in hook shaft 18. The joined wire strand and the hook shaft are placed in a mold with a cavity of the desired jig head shape, which in this preferred embodiment is cone-shaped. The junction of the wire strand and the hook is positioned near the center of the mold cavity, and a suitable material, such as melted lead, is poured into the cavity, and allowed to harden. After removal from the mold, the wire strand will be protruding out of the front of the jig head, and the hook out the back.

Line tie loop 10 is formed by bending wire strand 35 protruding from the front of the jig head into a nearly circular shape with an outside diameter of about ³⁄₃₂ of an inch. A fine wire wrap 36, sturdy thread or similar such strands are used to complete and secure the line tie loop. The remaining wire strand is bent to extend rearwardly toward, and in a position slightly above the hook point, and thereby forms main shaft 32 of weedguard 31.

Figure 3:
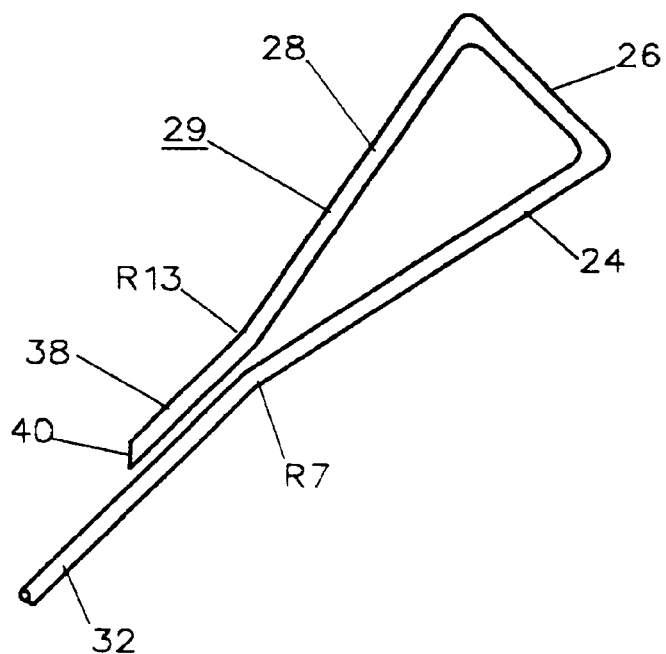
FIG. 3 is a view of a weedguard snag deflector demonstrating its geometric shape.

Referring now to FIG. 3, the detail of snag deflector 29 of weedguard 31 is shown. The distal end of the main shaft 32 of the weedguard is bent into a geometric shape, which in the preferred embodiment is an elongated isosceles triangle consisting of sides 24 and 28, each about ¾ inch long, and with base 26, about ⅜ inches long. Side 28 is then bent forming angle R13 and terminal segment 38 which is adjacent to and parallel with main shaft 32. The terminal segment extends from angle R13 to wire end 40, a distance of about ¼ inch.

Figure 4:
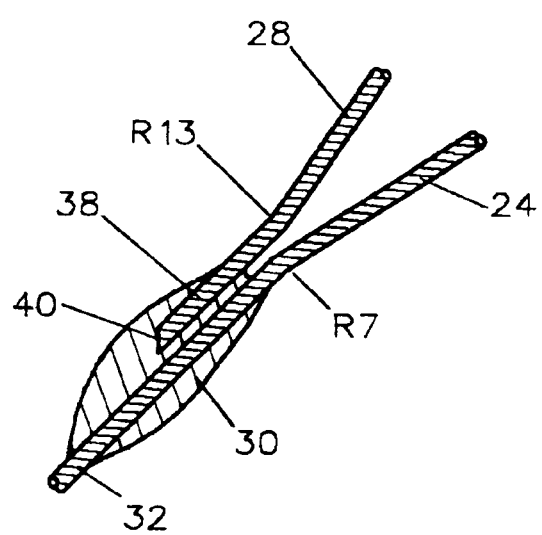
FIG. 4 is a sectional view of an encasement from the longitudinal perspective.

Referring now to FIG. 4, an encasement 30 of the wire end and a segment of the main shaft of the weedguard is shown. This encasement is formed by applying a drop a waterproof vinyl paint positioned so that wire end 40 is contained at or near the center of the drop. When the paint is dry, the encasement has a smooth surface with no rough areas or protruding ends evident to the touch. The thickness of the paint encasement can be increased, as desired, by adding a second drop of paint, after the first has dried. When finished, the encasement allows the weedguard to pass easily through weeds without snagging.

To complete the manufacturing process the jig head is covered with one or more coats of durable and waterproof paint of a desired color. In addition to providing color the final coat(s) of paint serve to cover and smooth fine wire wrap 36.

Usually a multifilamented flexible skirt, bucktail or trailer with hook concealing properties is attached to or around jig head neck 14 with a rubber collar or winding. Retaining knob 16 prevents the trailer from being easily pulled off during use.

Thus, in the preferred embodiment, the jig presents a smooth surface which is free from weed catching irregularities on the weedguard itself and from the line tie loop in the front, to the most distal portion of the hook bend in the back.

Additionally, main shaft 32 of the weedguard protects the hook from snagging from the front. Sides 24 and 28 of deflector 31, provide lateral snag protection, and base 26 of the deflector prevents snagging from the back. As a unit, the main shaft, the sides and the base provide combined snag protection from the top.

Furthermore, the excellent full length and multi-directional flex characteristics of the wire weedguard allows for full exposure of the hook when the jig is engulfed by a fish. The final result is a high percentage of fish landed to those which have bitten, and a substantial reduction in the number of snags encountered.

Figure 5:
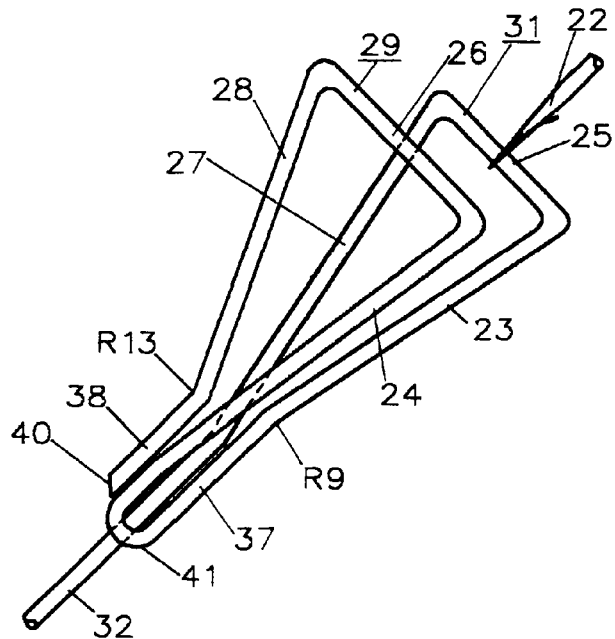
FIG. 5 is a view of a weedguard with two snag deflectors.

If the fisherman's intent is to use the jig in a selected fishing location characterized by a profusion of submerged bushes and woody brush additional snag protection from the underside can be provided to the hook point, as shown in FIG. 5.

In this modified embodiment, two snag deflectors 29 and 31 of similar dimensions, one upper, one lower, project from the main shaft of the weedguard. The lower deflector 31 is formed first by bending the main shaft of the weedguard into the shape of an isosceles triangle with sides 23, 27, and base 25. Side 23 extended is bent forming an angle R9 and a wire segment 37 which is then adjacent and parallel to the main shaft. The remaining length of wire segment 37 is bent 360° at 41 and is thereby extending rearwardly and can be formed into an upper deflector 29. The upper deflector is also described by an isosceles triangle consisting of sides 24 and 28 with base 26. Side 28 extended is bent forming angle R13 and wire segment 38 which is then adjacent and parallel to the main shaft and also wire segment 37. Wire end 40 results when wire segment 38 is cut about ¼ inch from angle R13.

The lower deflector is positioned in a plane about 35° from that formed by the main shaft and the upper deflector. The plane of both deflectors are desirably 90° from that of the hook, and the hook point is between base 25 and base 26, equidistant from both.

The total length of the weedguard is such that flexing of the weedguard in any direction will not produce contact between the hook point and base 25 or 26 of the weedguard itself. An encasement is created with a drop of vimyl paint positioned so that wire end 40 and wire bend 41 are at or near the center of the drop. Also included in the encasement is a proximal segment of the main shaft of the weedguard. Additional drops of paint can be added as desired to increase the thickness of the encasement.

Figure 6:
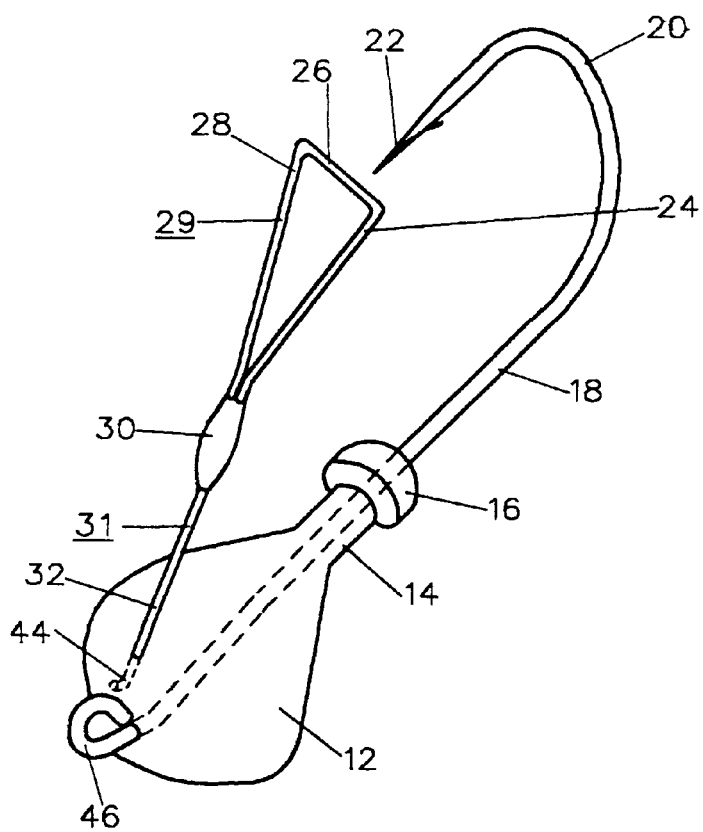
FIG. 6 is an isometric view of a modified embodiment with the hook eye projecting out of a jig head.

Referring now to FIG. 6, another modified embodiment of this invention is shown. This modified embodiment comprises a bulbous shaped jig head 12 with a neck 14 and a retaining knob 16 all molded around a shank 18 of a hook. The shank extends forwardly through and out of the jig head and terminates in a hook eye 46. The shank of the hook also extends rearwardly through and out of the jig head, where it terminates in a hook bend 20 and a point and barb 22. A weedguard 31 is formed independently from the hook shank or the hook eye by molding one end of a strand of stainless steel wire into the jig head. An L-shaped bend 46 at the end of the wire securely holds the wire inside the jig head and eliminates any rotation of the weedguard during use. The free end of the wire strand is directed rearwardly toward the hook point and barb thereby forming main shaft of weedguard. Completion of the weedguard snag deflector is accomplished as described above and as illustrated in FIGS. 3 & 4.

CONCLUSION, RAMIFICATIONS AND SCOPE OF THE INVENTION

The reader can see that a jig with a wire weedguard as presented in this invention represents a significant improvement over jig type fishing lures with any other type of weedguard known at present or in the past, because it is highly resistant to snagging from the top, front, both sides and the rear. Furthermore, the weedguard has the additional advantages in that:

- it can be flexed equally in all directions, a decided advantage since it cannot be predicted with any certainty what position the jig will be in after being engulfed by a fish;
- it has consistent flex characteristics throughout its entire length, allowing the full bite of the hook to be exposed in the fish's mouth, allowing the hook to penetrate easily and deeply;
- it provides for a smooth, non-weed collecting surface on the weedguard itself, thereby reducing the lost time, effort, and annoyance experienced by the fisherman when his lure is fouled by a collection of weeds;
- it eliminates the possibility that the weedguard itself could contact the hook point, which could potentially interfere with the fisherman's attempt to set the hook in the mouth of the fish;
- it can also provide snag protection to the hook point from the underside when the embodiment is selected which features two wire snag deflectors, a significant advantage to a fisherman who chooses to fish in an area containing large quantities of submerged brush.

While the above description; contains many specificities, these should not be construed as limitations on the scope of the invention, but rather as an exemplification of some of the presently preferred embodiments thereof. Many other variations are possible.

For example, the shape of the jig head can take numerous forms, only two of which are shown here. Also the color, or combination of colors used in the final coats of paint on the jig head and the weedguard encasement are limited only by the imagination of the manufacturer. In addition, the material used to make the jig head is not limited to lead, thereby its physical properties can vary widely depending on the material selected.

Further, the material used to form the weedguard is not limited to stainless steel wire. Any material possessing the desired characteristics of flexibility, memory, durability, and strength will suffice. For example, wire cable, twisted wire strands, fiberglass, graphite, boron, or similar such materials could be used in addition to others.

With regard to the hook used, a wide range of hook styles and sizes could be selected. For example, in the preferred embodiment, a hook with an eye could be used if desired without departing from the spirit of the invention.

Also the geometric shape of the weedguard snag deflector is not limited to an isosceles triangle. Any geometric shape which will provide protection to the hook point from the front, both sides and the back, while retaining the desired weed-shedding ability will suffice.

Additionally, the dimensions of the weedguard snag deflector are not limited to those given. The dimension can vary substantially while still providing the desired snag protection to the hook.

Finally, the material used to form the encasement is not limited to vinyl paint. Many other non-metallic materials can be used, as long as the final characteristics of weed-shedding smoothness, durability, and the strength to firmly secure the wire end of the weedguard to the primary shaft are achieved. For example, fiberglass, epoxy resins, plastics, heat shrinkable tubing, among others could be used. Also, the weedguard could be formed as a single unit from plastic, fiberglass or similar such materials and incorporated into the jig as such.

Thus the scope of the invention should be determined by the appended claims and their legal equivalents, rather than by the examples given.

I claim:

1. A jig type fishing lure with an improved weedguard comprising:

a hook having a shank, a bend, and a point wherein the shank and bend lie in substantially the same plane;

a moulded jig head formed around the end of said shank of said hook opposite said bend and said point;

a flexible strand having a proximal end portion, a distal end portion and a mid-section portion, said proximal end portion of said flexible strand is moulded into said jig head, said distal end portion and said mid-section portion of said flexible strand project out of said jig head in a forwardly direction, said distal end portion being bent into a substantially planar triangular shape wherein the distal most end of the strand is positioned adjacent the mid-section of said flexible strand, the base of said triangular shape is positioned near said point of said hook and the plane of the triangular shape is oriented approximately 90 degrees from the plane defined by said hook and the total length of said flexible strand projecting from said jig head including said triangular shape is such that said base of said triangular shape is adjacent to said point of said hook but is incapable of contacting said point of said hook; and, an encasement formed from a non-metallic waterproof material surrounding said distal most end of said flexible strand and a segment of the mid-section of said flexible strand whereby said encasement renders said weedguard free of weed catching irregularities.

2. The jig type fishing lure of claim 1 wherein said non-metallic waterproof material is paint.

3. The jig type fishing lure of claim 1 further comprising a plurality of said substantially triangular shapes formed from said flexible strand.

4. A jig type fishing lure with an improved weedguard comprising:

a hook having a shank, a bend, a point and an eye wherein the shank and bend lie in substantially the same plane;

a moulded jig head formed around the end of said shank of said hook opposite said bend and said point, with said eye projecting out of said jig head;

a flexible strand having a proximal end portion, a distal end portion and a mid-section portion, said proximal end portion of said flexible strand is moulded into said jig head, said distal end portion and said mid-section portion of said flexible strand project out of said jig head in a forwardly direction, said distal end portion being bent into a substantially planar triangular shape wherein the distal most end of the strand is positioned adjacent the mid-section of said flexible strand, the base of said triangular shape is positioned near said point of said hook and the plane of the triangular shape is oriented approximately 90 degrees from the plane defined by said hook and the total length of said flexible strand projecting from said jig head including said triangular shape is such that said base of said triangular shape is adjacent to said point of said hook but is incapable of contacting said point of said hook; and, an encasement formed from a non-metallic waterproof material surrounding said distal most end of said flexible strand and a segment of the mid-section of said flexible strand whereby said encasement renders said weedguard free of weed catching irregularities.

5. The jig type fishing lure of claim 4 wherein said non-metallic waterproof material is paint.

6. The jig type fishing lure of claim 4 further comprising a plurality of said substantially triangular shapes formed fron said flexible strand.

* * * * *